Patented Apr. 17, 1923.

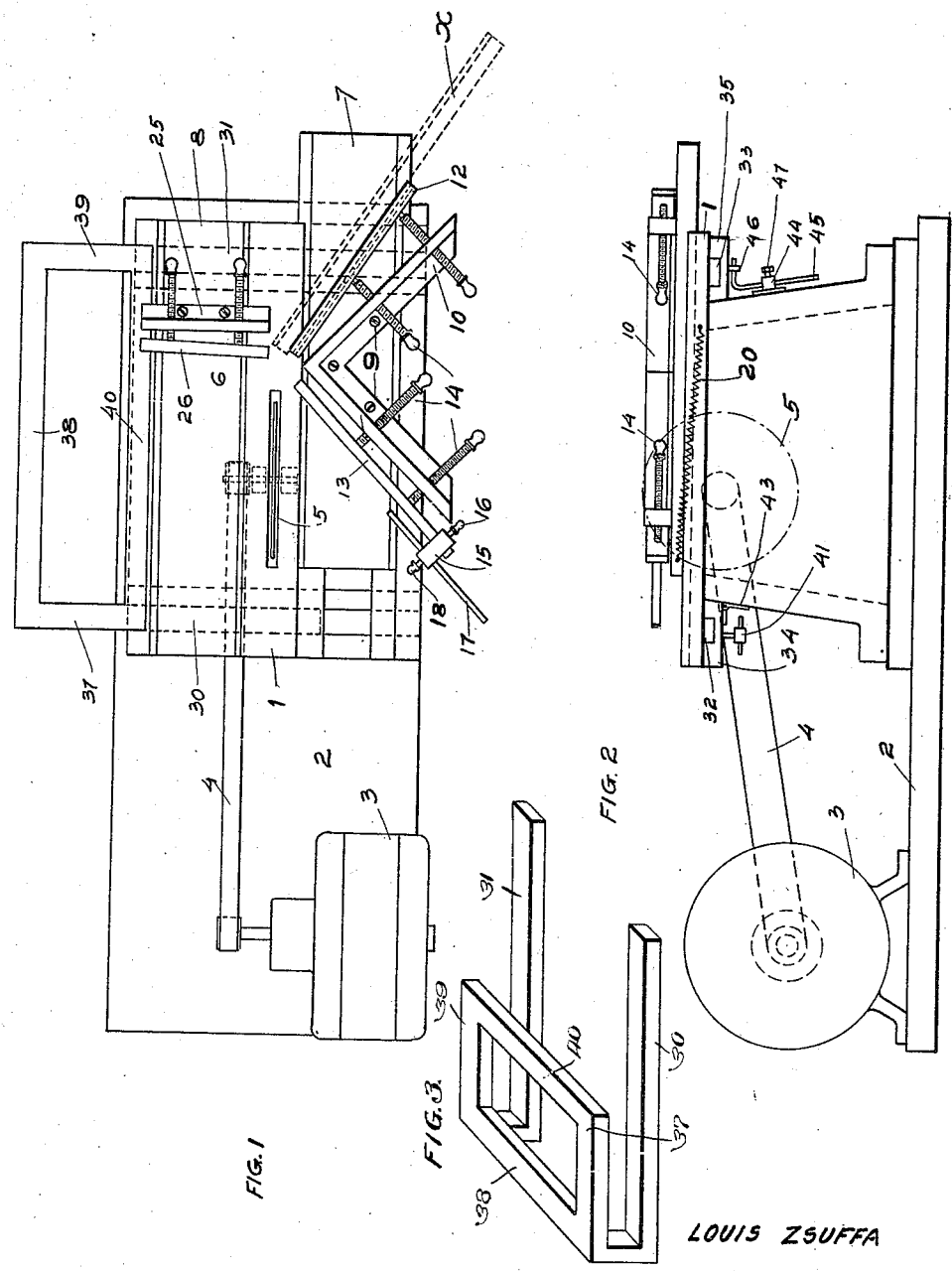

1,452,233

UNITED STATES PATENT OFFICE.

LOUIS ZSUFFA, OF NEW YORK, N. Y.

COMBINED MOLDING-SETTING DEVICE FOR CIRCULAR SAWS.

Application filed April 7, 1921. Serial No. 459,378.

*To all whom it may concern:*

Be it known that I, LOUIS ZSUFFA, a citizen of Hungary, and resident of New York, in the county of New York and State of New York, have invented certain new and useful Improvements in Combined Molding-Setting Devices for Circular Saws, of which the following is a specification.

This invention relates to machines by which pieces of material, such as molding and the like, are cut by a circular saw at an angle in order to form a bevel joint or miter when the ends of the pieces are joined together.

The object of the present invention is to provide a simple, compact and efficient machine in which the material may be cut:—

(1.) At any desired angle and either at one or both ends as may be required.

(2.) At a right angle, or approximately so.

(3.) Longitudinally in contradistinction to transversely as above.

A further object is to provide a table having a top capable of being raised or lowered at one end whereby the extent to which the saw projects through its slot in said top may be regulated in accordance with the class of material being dealt with.

With the foregoing and other objects in view the invention will now be described with reference to the accompanying drawings which disclose one practical embodiment thereof, and in which:—

Figure 1 is a top plan view of a mitering machine constructed according to the present invention.

Figure 2 is a side view thereof, and,

Figure 3 is an end view of a frame employed for cutting material longitudinally.

Referring to the drawings, there is shown a table 1 carried by a base 2, which latter also carries an electric motor 3, driving, by means of a belt 4, a circular saw 5 extending through a slot 6 cut in the top of the table 1, and secured to the latter by means of dove-tailed connections or otherwise are two sliding sections 7 and 8, which are capable of being moved longitudinally of the table.

The section 7 has secured thereto, by screws 9 or otherwise, a piece of angle-iron or wood 10 of L-shaped cross section, the arms of which are disposed at an angle of 90° to each other as will be clearly seen from Figure 1. On the outside of the angle piece 10 are placed bars 12 and 13, each of which is adapted to be independently adjusted by means of elongated screws 14 passed through screw-threaded holes in the angle piece 10. The elongated screws are formed at one end with rounded heads to permit of ready manual operation, whilst their opposite ends are enlarged and retained in a groove running longitudinally of the bars 12 and 13 respectively as shown dotted at bar 12.

The bar 13 is provided with a limiting device comprising a body portion 15 adapted to slide on the bar 13 or an extension of same but securable thereto in any desired position by a set screw 16, and a rod 17 adapted to slide in the body 15 but securable thereto in any desired position by a set screw 18.

When it is desired to cut a piece of material at an angle, the bar 12 is adjusted to give that angle of cut, the material is placed against the bar 12 as shown at $x$ in Figure 1, and the cut is made by moving the sliding table section 7 longitudinally so that the material is brought into contact with the saw.

If it is desired to make a cut at an equal but opposite angle at the opposite end of the material, the bar 13 is adjusted to give such angle of cut, the material is placed thereagainst and the cut made as above, the stop being also previously adjusted so that the cut will be made at the right distance from the cut first made.

As the table section 7 is only used for cutting purposes in one direction, that is to say, when moving from right to left in Figure 1, a spring 20 is provided, attached at one end to said section and at the other end to a fixed part of the table, to automatically return said section to its starting position, after a cut has been made.

There has been described above the means employed for cutting material at an angle; there will now be described the means that I employ for cutting material at a right angle or approximately so and also to cut considerably longer pieces than could be done on section 7.

For such purposes to the table section 8 at right angles to the saw blade there is secured a straight bar 25 of L-shape in cross section, and in front thereof is disposed a bar 26 adjustable with relation to said straight bar by means of devices similar to the elongated screws 14 described above.

To cut a piece of material—and this construction is particularly convenient for cutting extra long pieces—at a right angle or approximately so, the same is placed against the bar 26 and the section 8 moved longitudinally in a manner similar to the section 7 and in a manner well understood.

A spring, similar to the spring 20, can also be provided to automatically return this section to its starting position.

In order to cut material longitudinally in contradistinction to more or less transversely as above described, there is provided a frame comprising two bottom members 30, 31 slidable in recesses 32, 33 formed in blocks 34, 35 attached to or formed integral with the underside of the table 1, connecting member 36, and upper members 37, 38, 39 and 40, the latter being arranged to move over the upper surface of the table top. If desired this frame may be cast in one piece.

When it is desired to cut material in the manner just stated, the slidable section 8 is removed from the top of the table, the frame placed in position and adjusted so that the outside of the member 40 is the correct distance from the saw to cut the material longitudinally along the desired line, the material is placed against the outside of the member 40 and moved longitudinally of said member against the saw. The frame may be fixed in the adjusted position by means of set screws 41 passing through screw-threaded holes in the blocks 34 and 35.

Means are also provided for raising or lowering the top of the table and its attachments at one end so as to decrease or increase the distance that the saw blade 5 projects through its slot 6 and thus facilitate the cutting of material of different sizes. For example, if a small and light piece of material is to be cut it is evident that this operation will be better accomplished if the saw blade project but a little through its slot, and vice versa, with larger and heavier pieces of material.

In order to carry this into effect the top of the table at one end of the machine is hinged to its supports by hinges 43 and at the other end loosely rests on said supports. At this latter end the supports are provided each with a clamp 44 through which extends a rod 45 bent at its upper end to engage an eye 46 fixed to the underside of the block 35. Thus the table top can be raised, and secured at the desired elevation, by securing the rod 45 by means of the set screw 47.

What I claim is:—

In a mitering machine, two sections adapted to slide longitudinally of the table, an L-shaped angle piece, also L-shaped in cross section, removably secured to one of said sections; a straight piece, L-shaped in cross section, removably secured to the second sliding section in a perpendicular direction to the plane of the saw blade, straight bars for receiving the material to be cut, adjustably connected to the faces of said angle piece and said straight piece; thumb screws passing through the vertical sides of said L-shaped pieces and adapted to adjust said bars therewith with relation to said angle and straight pieces, and a stop carried by one of said bars for gauging the length of the material to be cut.

Signed at New York, in the county of New York and State of New York, this 26th day of March, A. D. 1921.

LOUIS ZSUFFA.